(12) United States Patent
Mochizuki et al.

(10) Patent No.: US 10,728,671 B2
(45) Date of Patent: Jul. 28, 2020

(54) ELECTRO-ACOUSTIC TRANSDUCER SYSTEM

(71) Applicant: Audio-Technica Corporation, Tokyo (JP)

(72) Inventors: Yukiko Mochizuki, Tokyo (JP); Toyokazu Eguchi, Tokyo (JP)

(73) Assignee: Audio-Technica Corporation, Tokyo (JP)

( * ) Notice: Subject to any disclaimer, the term of this patent is extended or adjusted under 35 U.S.C. 154(b) by 0 days.

(21) Appl. No.: 16/196,631

(22) Filed: Nov. 20, 2018

(65) Prior Publication Data

US 2019/0200136 A1 Jun. 27, 2019

(30) Foreign Application Priority Data

Dec. 27, 2017 (JP) .................................. 2017-251771

(51) Int. Cl.
| | |
|---|---|
| H04R 9/02 | (2006.01) |
| H02J 50/10 | (2016.01) |
| H04R 1/02 | (2006.01) |
| H02J 7/02 | (2016.01) |
| H02J 7/00 | (2006.01) |
| H04B 5/00 | (2006.01) |

(52) U.S. Cl.
CPC .............. *H04R 9/025* (2013.01); *H02J 7/025* (2013.01); *H02J 50/10* (2016.02); *H04R 1/028* (2013.01); *H02J 7/0047* (2013.01); *H02J 7/0048* (2020.01); *H04B 5/0037* (2013.01)

(58) Field of Classification Search
CPC ........ H04R 25/30; H02J 7/0047; H02J 50/10; H02J 2007/005
See application file for complete search history.

(56) References Cited

U.S. PATENT DOCUMENTS

2007/0104343 A1* 5/2007 Bengtsson ........... H04R 25/305
381/323
2019/0089187 A1* 3/2019 Konomi .................. H02J 50/70

FOREIGN PATENT DOCUMENTS

| JP | 2009-267582 A | 11/2009 | |
|---|---|---|---|
| WO | WO-2017086553 A1 * | 5/2017 | ................ H02J 7/02 |

* cited by examiner

*Primary Examiner* — Sunita Joshi
(74) *Attorney, Agent, or Firm* — W&C IP (57) ABSTRACT

An acoustic system includes: a charging apparatus, and speakers that are chargeable with the charging apparatus. The speakers include: a speaker unit that generates a sound based on the first electrical signal, and a power reception coil that is configured to be disposed to have at least a part of it overlaps with the extension line of the central axis of a power transmission coil of the charging apparatus and generates electric power to be supplied to the speaker unit with a magnetic flux generated by a power transmission coil.

18 Claims, 9 Drawing Sheets

ELECTRO-ACOUSTIC TRANSDUCER SYSTEM

CROSS-REFERENCE TO RELATED APPLICATIONS

The present application claims priority to Japanese Patent Application number 2017-251771, filed on Dec. 27, 2017. The contents of this application are incorporated herein by reference in their entirety.

TECHNICAL FIELD

The present invention relates to an electro-acoustic transducer system that converts an electrical signal into a sound for a speaker, a headphone, an earphone, a hearing aid, and the like.

BACKGROUND OF THE INVENTION

Conventionally, an electro-acoustic transducer apparatus having a chargeable secondary battery built in is known. Patent Document, Japanese Unexamined Patent Publication No. 2009-267582, discloses a hearing aid having a non-contact charge function.

In the conventional hearing aid, it has been presumed that two hearing aids are charged in a state where they are disposed in parallel within an area in which a magnetic flux generated by a power transmission coil for supplying electric power can be received. When charging two hearing aids disposed in parallel, a power reception coil inside each hearing aid is deviated from a position of the center axis of the power transmission coil. In this case, there was a problem that charging efficiency is poor because the magnetic flux that passes through the power reception coils is scarce.

BRIEF SUMMARY OF THE INVENTION

This invention focuses on these points, and an object of the invention is to improve charging efficiency at the time of charging a plurality of electro-acoustic transducer apparatuses.

The electro-acoustic transducer system according to the first aspect of the present invention includes the first electro-acoustic transducer, the second electro-acoustic transducer, and a charging apparatus that charges the first electro-acoustic transducer and the second electro-acoustic transducer. The charging apparatus includes: an electric power acquisition part that acquires electric power from an exterior power supply; and a power transmission coil that generates a magnetic flux based on electric power acquired by the electric power acquisition part, and the first electro-acoustic transducer includes: the first electro-acoustic transducer part that generates a sound based on the first electrical signal; and the first power reception coil that generates electric power to be supplied to the first electro-acoustic transducer part with the magnetic flux generated by the power transmission coil, the first power reception coil being configured to be disposed at a position where at least a part of the first power reception coil overlaps with an extension line of a central axis of the power transmission coil, and the second electro-acoustic transducer includes: the second electro-acoustic transducer part that generates the sound based on the second electrical signal; and the second power reception coil that generates electric power to be supplied to the second electro-acoustic transducer part with the magnetic flux generated by the power transmission coil, the second power reception coil being configured to be disposed at a position where at least a part of the second power reception coil overlaps with the extension line of the central axis of the power transmission coil.

The electro-acoustic transducer system according to the second aspect of the present invention is an electro-acoustic transducer system configured with the first electro-acoustic transducer and the second electro-acoustic transducer that are chargeable with a charging apparatus, wherein the first electro-acoustic transducer includes: the first electro-acoustic transducer part that generates a sound based on a first electrical signal; and the first power reception coil that generates electric power to be supplied to the first electro-acoustic transducer part with a magnetic flux generated by the power transmission coil, the first power reception coil being configured to be disposed at a position where at least a part of the first power reception coil overlaps with an extension line of a central axis of the power transmission coil, and the second electro-acoustic transducer includes: the second electro-acoustic transducer part that generates a sound based on a second electrical signal; and the second power reception coil that generates electric power to be supplied to the second electro-acoustic transducer part with the magnetic flux generated by the power transmission coil, the second power reception coil being configured to be disposed at a position where at least a part of the second power reception coil overlaps with the extension line of the central axis of the power transmission coil.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

First Embodiment

[Outline of an Acoustic System S1]

Figure 1A:
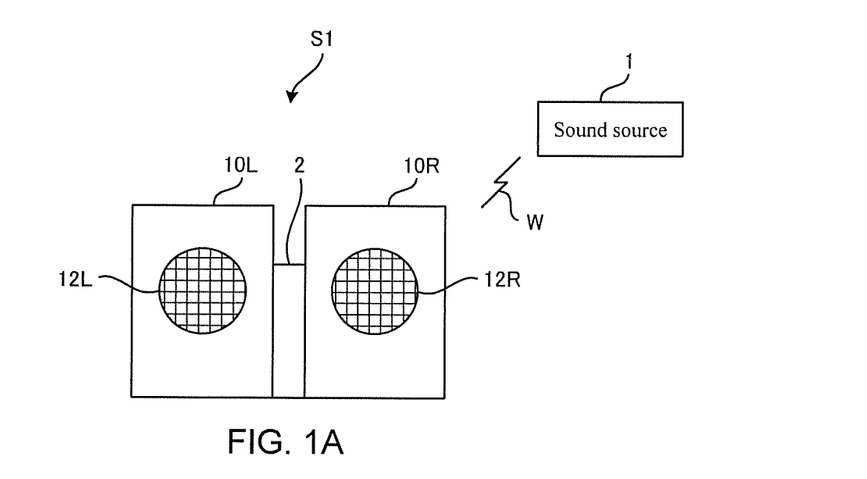
FIGS. 1A to 1C show configurations of an acoustic system according to the first embodiment.
Figure 1B:
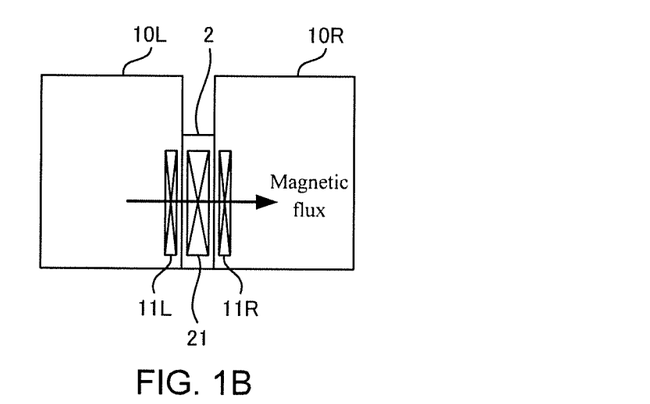
Figure 1C:
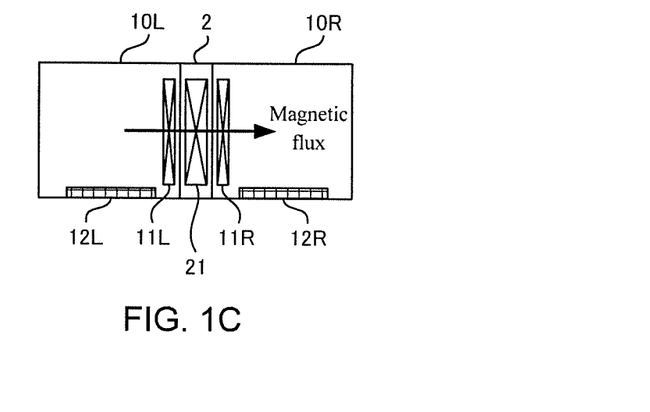

FIGS. 1A to 1C show configurations of an acoustic system S1 according to the first embodiment. The acoustic system S1 is a system that generates a sound based on an electrical signal output by a sound source 1 which includes a left channel stereo sound source and a right channel stereo sound source. The acoustic system S1 is an acoustic transducer system that includes a left channel speaker 10L, serving as the first acoustic transducer, a right channel speaker 10R, serving as the second acoustic transducer, and a charging apparatus 2 for non-contact charging of both speakers 10L and 10R. The speakers 10L and 10R each incorporate a secondary battery which is chargeable by the charging apparatus 2. The speakers 10L and 10R receive sound signals from the sound source 1 via a wireless channel W such as Bluetooth®, and generate sounds corresponding to the received sound signals.

FIGS. 1A to 1C show an arrangement state of the speakers 10L and 10R at the time of charging, and the speaker 10L and 10R are installed to contact a left side and a right side of the charging apparatus 2, respectively. When not charging the speakers 10L and 10R, the user may place the speakers 10L and 10R in positions away from the charging apparatus 2. Since the speakers 10L and 10R are operated by electric power supplied from the respective secondary batteries incorporated therein and obtain the sound signals via the wireless channel W, the user can place the left channel speaker 10L and the right channel speaker 10R at any positions.

FIG. 1A shows a front view of the acoustic system S1. FIG. 1B is a schematic diagram showing an internal structure of the acoustic system S1 viewed from the front. FIG. 1C is a schematic diagram showing an internal structure of the acoustic system S1 when seen from above. As shown in FIGS. 1B and 1C, the speaker 10L has a power reception coil 11L, serving as the first power reception coil, and the speaker 10R has a power reception coil 11R, serving as the second power reception coil. Also, the charging apparatus 2 has a power transmission coil 21.

Also, the left channel speaker 10L has a left channel speaker unit 12L, serving as the first acoustic transducer part, which generates a sound based on the first electrical signal output by the sound source 1. The right channel speaker 10R has a right channel speaker unit 12R, serving as the second acoustic transducer part, which generates a sound based on the second electrical signal output by the sound source 1. The first electrical signal is an electrical signal corresponding to a sound for the left channel, and the second electrical signal is an electrical signal corresponding to a sound for the right channel.

In the acoustic system S1, the speaker 10L has the power reception coil 11L, serving as the first power reception coil, near the side surface which is disposed close to a side of the charging apparatus 2 when electric power should be generated based on the magnetic flux generated by the power transmission coil 21. Also, the speaker 10R has the power reception coil 11R, serving as the second power reception coil, near the side surface which is disposed close to a side of the charging apparatus 2 when electric power should be generated based on the magnetic flux generated by the power transmission coil 21. In principle, this is due to electromagnetic induction that causes the power transmission coil 21 to generate a magnetic flux inside the coil by applying an alternating current and induces an electric current in the power reception coils 11L and 11R that are magnetically coupled to the power transmission coil 21.

In a state of charging the speakers 10L and 10R with the charging apparatus 2, the power reception coils 11L and 11R are configured to be disposed in the vicinity of the side surface closer to the charging apparatus 2 in the speakers 10L and 10R, respectively. Specifically, the power reception coil 11L is disposed at a position closest to the power transmission coil 21 in the vicinity of a right side of the speaker 10L. Also, the power reception coil 11R is disposed at a position closest to the power transmission coil 21 in the vicinity of a left side of the speaker 10R. In the acoustic system S1, the charging apparatus 2, the speaker 10L and the speaker 10R are configured to be disposed in a state where the power transmission coil 21 is positioned between the power reception coils 11L and 11R.

Here, the power reception coils 11L and 11R are disposed at positions where at least a part of the power reception coil 11L and a part of the power reception coil 11R overlap with the extension line of the central axis of the power transmission coil 21. The power reception coils 11L and 11R generate electric power to be supplied to each part such as the speaker unit 12 with the magnetic flux generated by the power transmission coil 21. The power reception coils 11L and 11R are configured so that, for example, while they are being charged, the extension line of the central axis of the power transmission coil 21 can be inclusively disposed inside circles formed of wire materials configuring the power reception coils 11L and 11R. The power reception coils 11L and 11R may be configured so that, while they are being charged, their central axes are disposed on the extension line of the central axis of the power transmission coil 21.

Figure 2A:
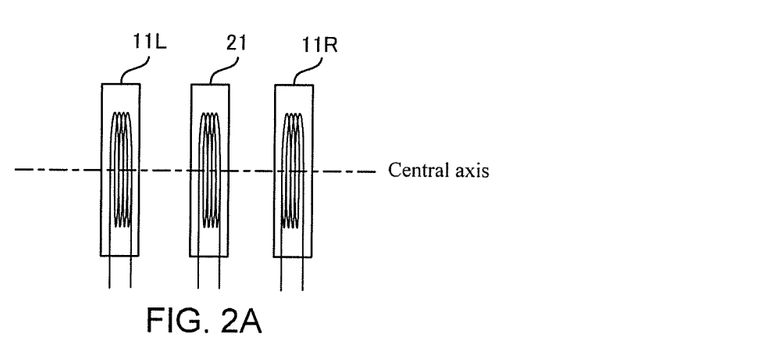
FIGS. 2A and 2B illustrate central axes of power reception coils and a power transmission coil.
Figure 2B:
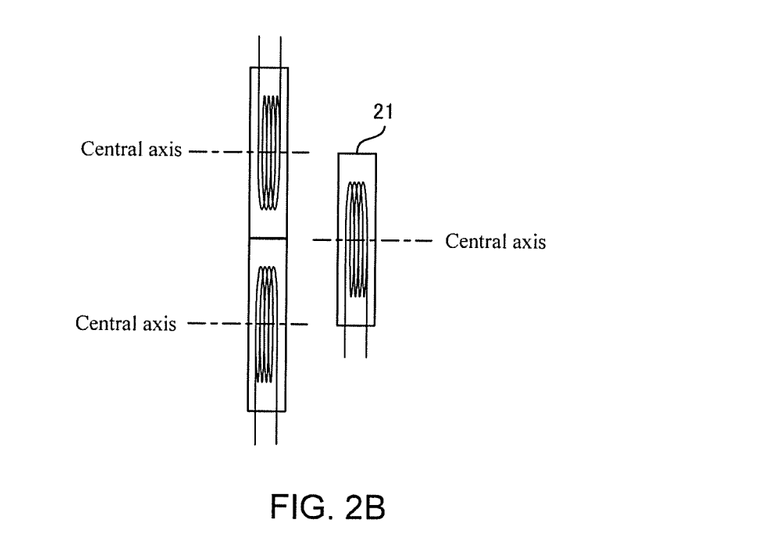

FIGS. 2A and 2B illustrate the central axes of the power reception coil 11L, the power reception coil 11R, and the power transmission coil 21. FIG. 2A shows a case where the central axes of the power reception coils 11L and 11R are on the extension line of the central axis of the power transmission coil 21. FIG. 2B shows a case where a part of each of the power reception coils 11L and 11R overlaps with the extension line of the power transmission coil 21. FIG. 2B shows a case where the central axes of the plurality of reception coils are not on the extension line of the power transmission coil 21.

As shown in FIGS. 2A and 2B, the central axis of each of the power reception coil 11L, the power reception coil 11R, and the power transmission coil 21 is a line connecting centers of a plurality of circles formed with windings. In an example shown in FIG. 2A, the center position of the power transmission coil 21 is configured to be able to be positioned on a line that connects the respective center positions of the power reception coils 11L and 11R. As shown in FIGS. 2A and 2B, if at least a part of the power reception coil 11L and at least a part of the power reception coil 11R overlap with the extension line of the central axis of the power transmission coil 21, a magnetic flux that passes through the central axis of the power transmission coil 21 passes inside of circles formed of wire material of the power reception coils 11L and 11R, and thus the power reception coils 11L and 11R can generate electric power with high efficiency in comparison with the case shown in FIG. 2B.

When the same magnetic flux passes through the power reception coils 11L and 11R, the magnitude of electric power to be generated is determined by characteristics of the power reception coils 11L and 11R, such as the number of turns, the diameter of the coil, and the diameter or material of the coil wire material. In order to complete the charging at approximately the same time in the speakers 10L and 10R, it is preferable for the power reception coils 11L and 11R to generate the same electric power. Therefore, the above-mentioned characteristics, such as the number of turns, of the power reception coils 11L and 11R in the acoustic system S1 are set to be the same.

[Detailed Configuration of the Acoustic System S1]

Figure 3:
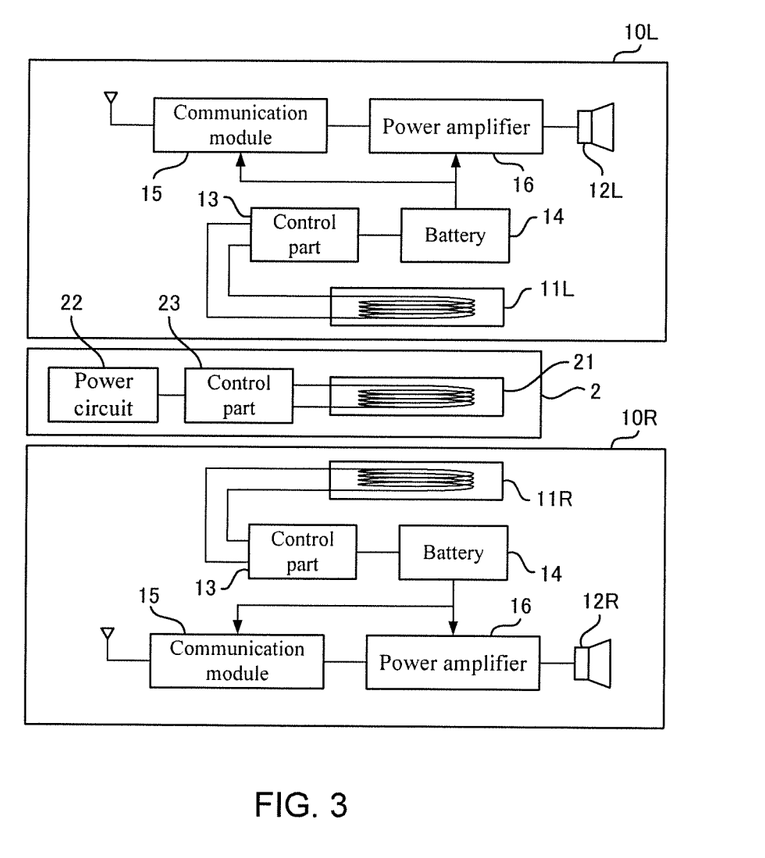
FIG. 3 shows a detailed configuration of an acoustic system.

FIG. 3 shows a detailed configuration of an acoustic system S1. As shown in FIG. 3, the speakers 10L and 10R each have a control part 13, a battery 14, a communication module 15, and a power amplifier 16 in addition to the power reception coil 11L, the power reception coil 11R, the speaker unit 12L, and the speaker unit 12R which are explained by referring to FIGS. 1A to 1C. In the explanation below, when there is no need to distinguish the left channel power reception coil 11L from the right channel power reception coil 11R, the power reception coil 11L or the power reception coil 11R may be referred as a power reception coil 11. Similarly, when there is no need to distinguish the left channel speaker unit 12L from the right channel speaker unit 12R, the speaker unit 12L or the speaker unit 12R may be referred as a speaker unit 12.

The control part 13 is configured with electronic circuits including a central processing unit (CPU), a regulator, or the like and performs control for charging the battery 14 based on electric power generated by the power reception coil 11. By detecting the remaining charge amount of the battery 14, the control part 13 controls electric power to be supplied to the battery 14 based on a result of this detection. The control part 13, for example, starts supplying electric power generated by the power reception coil 11 to the battery 14 if the remaining charge amount of the battery 14 is equal to or less than a threshold value.

Upon detecting that electric power is not supplied from the power reception coil 11 when the remaining charge amount of the battery 14 has become equal to or less than the threshold value, the control part 13 may control the speaker unit 12 to emit a warning sound. By this, a user can start the charging when the remaining charge amount of the battery 14 decreases, and thus it can prevent a sudden loss of power of the speakers 10L and 10R.

The battery 14 is the secondary battery which is repeatedly chargeable with electric power generated by the power reception coil 11, and is, for example, a lithium-ion battery or a nickel hydride battery. The battery 14 supplies electric power to the speaker unit 12 and other parts of the speaker 10.

The communication module 15 is a communication interface for receiving sound signals emitted from the sound source. The communication module 15 has, for example, a high frequency circuit that sends and receives Bluetooth radio waves and a circuit that modulates and demodulates data being sent and received. The communication module 15 inputs, to the power amplifier 16, demodulated signals based on the sound signals received from the sound source.

The power amplifier 16 is an amplifier that amplifies sound signals input from the communication module 15. Due to the power amplifier 16 inputting the amplified sound signals to the speaker unit 12, a sound based on the sound signals received from the sound source is output from the speaker unit 12.

The charging apparatus 2 has a power circuit 22 and a control part 23 in addition to the power transmission coil 21 that is explained by referring to FIGS. 1A to 1C. The power circuit 22 functions as an electric power acquisition part that acquires electric power from an exterior power supply such as a commercial power supply, and supplies DC voltage generated based on the acquired electric power to the control part 23. The power circuit 22 includes, for example, an AC/DC converter, converts an AC voltage of 100V supplied form the commercial power supply into DC voltage, and supplies the converted DC voltage to the control part 23.

The control part 23 is configured to include a CPU and electronic circuits. The CPU, which the control part 23 has, (i) controls the electronic circuit to start supplying electric power to the power transmission coil 21 when detecting that at least one of the speakers 10L and 10R is at the chargeable position and (ii) controls the electronic circuit to prohibit supplying electric power to the power transmission coil 21 while not detecting that at least one of the speakers 10L and 10R is at the chargeable position.

The control part 23 may control the electronic circuit to start supplying electric power to the power transmission coil 21 under the conditions that (i) at least one of the speakers 10L and 10R is at the chargeable position and (ii) a piece of information that at least one of the speakers 10L and 10R needs to be charged is received from at least one of the speakers 10L and 10R. Methods for the control part 23 to receive the information from the speakers 10L and 10R are arbitrary. The charging apparatus 2 may have a communication module (not shown), and the control part 23 may send and receive the information by making the communication module wirelessly communicate with the communication module 15.

Figure 4A:
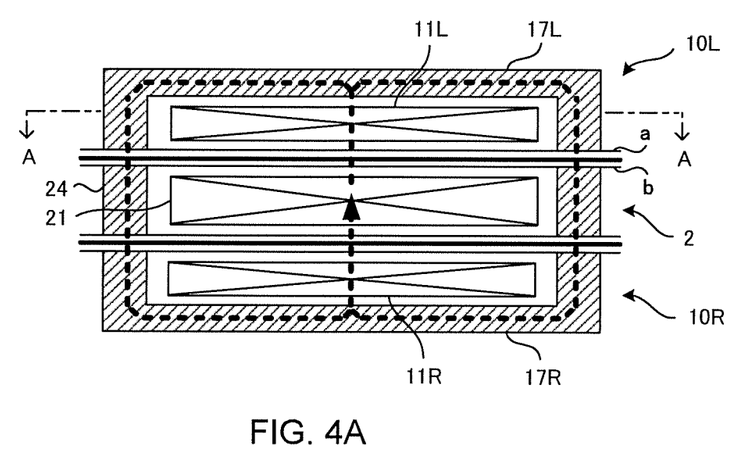
FIGS. 4A and 4B schematically show configurations around a power reception coil and a power transmission coil in a state where a speaker is being charged.
Figure 4B:
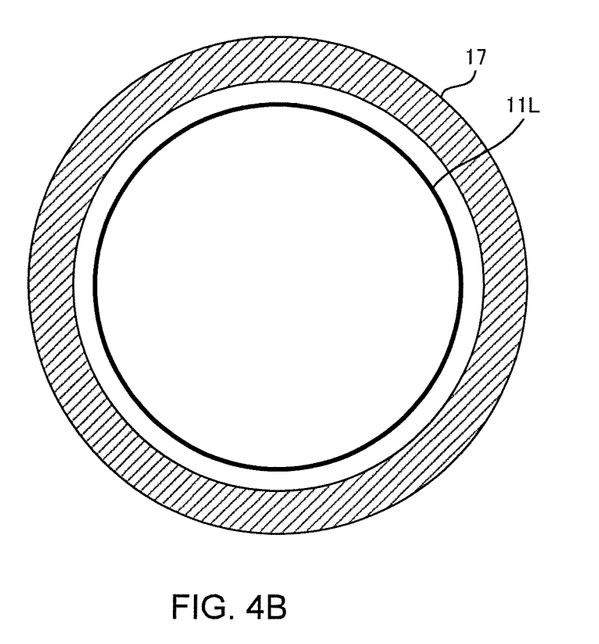

FIGS. 4A and 4B schematically show configurations around the power reception coil 11L, the power reception coil 11R, and the power transmission coil 21 in a state where the speaker 10 is charged. FIG. 4A shows a section view of a plane that passes through the central axes of the power reception coil 11L, the power reception coil 11R, and the power transmission coil 21. FIG. 4B shows a section view taken along an A-A line in a direction orthogonal to the central axes. In FIGS. 4A and 4B, a core material 17L, a core material 17R, and a core material 24 indicated with hatched lines are members composed of a magnetic substance for preventing a leakage of magnetic flux to the outside by shielding the magnetic flux generated by the power transmission coil 21. The members may be a ferrite core, for example.

The core materials 17L and 17R are each in a bottomed cylindrical shape with one opening closed, and the side opposite to the closed side (that is, the bottomed side) is fixed to the inner surface "a" of a housing of the speaker 10. The core material 24 is in a cylindrical shape with both ends fixed to an inner surface "b" of a housing of the charging apparatus 2. With such structures, two pieces of the core materials 17L and 17R together with the core material 24 form a cylindrical shape with both sides closed, and thus form a closed space where the magnetic flux does not leak to the outside.

If ferrite cores are used as the core material 17L, the core material 17R, and the core material 24, the magnetic flux generated by the power transmission coil 21 first penetrates through the power reception coil 11L of the speaker 10L, passes through the core material 17L, the core material 24, and the core material 17R, and then reaches the power reception coil 11R of the speaker 10R at the opposite side, as shown with the broken line in FIG. 4A. In this manner, the magnetic flux generated by the power transmission coil 21 penetrates through the power reception coils 11L and 11R without leaking to the outside. Therefore, the charging apparatus 2 can charge the speaker 10 efficiently.

As explained above, the acoustic system S1 includes two speakers 10L and 10R respectively having the power reception coils 11L and 11R whose central axes are configured to be disposed on the extension line of the central axis of the power transmission coil 21 of the charging apparatus 2. Since the acoustic system S1 is configured in such a manner, the efficiency of charging two speakers 10L and 10R by using the charging apparatus 2 having one power transmission coil 21 can be improved. Also, it is possible to charge two speakers 10L and 10R with one power transmission coil 21.

Second Embodiment

Figure 5A:
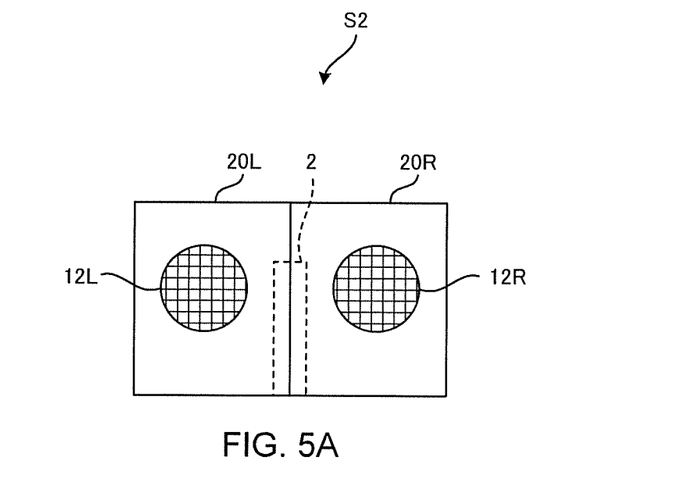
FIGS. 5A and 5B each show a configuration of an acoustic system according to the second embodiment.
Figure 5B:
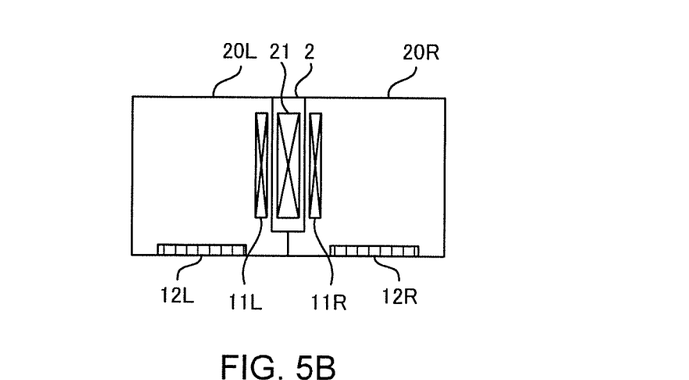

FIGS. 5A and 5B each show a configuration of an acoustic system S2 according to the second embodiment. In the acoustic system S1 according to the first embodiment shown in FIGS. 1A to 1C, the charging apparatus 2 disposed between the speakers 10L and 10R, while charging the speakers 10L and 10R, can be visually recognized from the front side. In contrast, in the acoustic system S2, the charging apparatus 2 cannot be visually recognized from the front side of a left channel speaker 20L and the front side of a right channel speaker 20R. On this point, the acoustic system S2 differs from the acoustic system S1. Hereafter, the points that differ from the acoustic system S1 will be explained.

FIG. 5A shows a front view of the acoustic system S2. FIG. 5B is a schematic diagram showing an internal structure of the acoustic system S2 when seen from above. As shown in FIGS. 5A and 5B, the acoustic system S2 is configured so that one side of the front face of the speaker 20L and one side of the front face of the speaker 20R contact each other in a state where the speakers 20L and 20R generate electric power with the magnetic flux generated by the power transmission coil 21. A level difference is formed on the side contacting the charging apparatus 2 in each of the speakers 20L and 20R, and a width of the front side where the speaker unit 12 is provided is greater than that of the rear side. Since the speakers 20L and 20R each have the aforementioned shape, the charging apparatus 2 can be disposed in a space with a level-difference portion. Consequently, the appearance is improved since the charging apparatus 2 cannot be visually recognized by the user while the speakers 20L and 20R are charged on both sides of the charging apparatus 2.

Third Embodiment

Figure 6A:
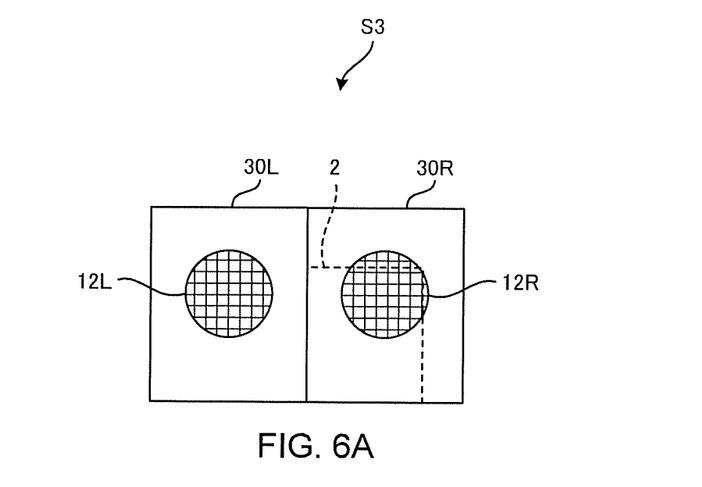
FIGS. 6A and 6B each show a configuration of an acoustic system according to the third embodiment.
Figure 6B:
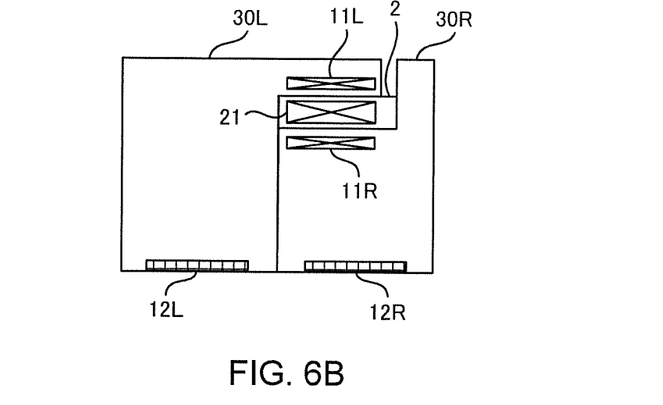

FIGS. 6A and 6B each show a configuration of an acoustic system S3 according to the third embodiment. In the acoustic system S2, a depth direction of each of the speakers 20L and 20R and a direction of the central axes of the power reception coil 11L, the power reception coil 11R, and the power transmission coil 21 are orthogonal to each other, whereas in the acoustic system S3, (i) the depth direction of each of a left channel speaker 30L and a right channel speaker 30R and (ii) the direction of the central axes of the power reception coil 11L, the power reception coil 11R, and the power transmission coil 21 are the same. In a case where the left channel speaker 30L and the right channel speaker 30R take such shapes, their appearance is also improved since the charging apparatus 2 cannot be visually recognized by the user while the speakers 30L and 30R are disposed at both sides of the charging apparatus 2 to be charged.

Fourth Embodiment

Figure 7A:
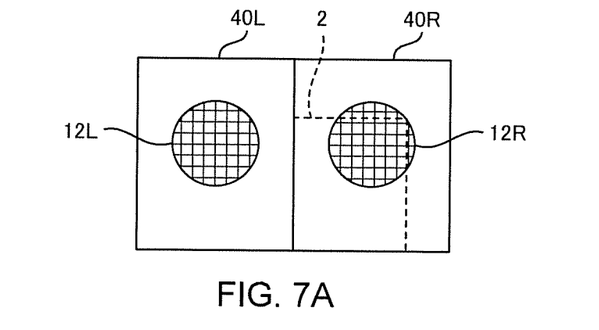
FIGS. 7A and 7B each show a configuration of an acoustic system according to the fourth embodiment.
Figure 7B:
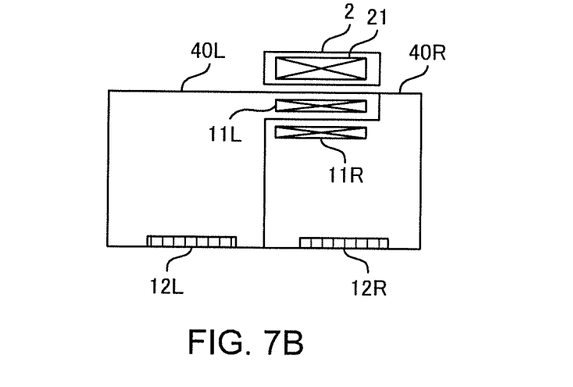

FIGS. 7A and 7B each show a configuration of an acoustic system S4 according to the fourth embodiment. The acoustic systems S1, S2, and S3 are configured so that the charging is conducted while a plurality of power reception coils 11L and 11R are disposed on both sides of the power transmission coil 21. In contrast, the acoustic system S4 is configured so that a left channel speaker 40L and a right channel speaker 40R will be charged while the power reception coil 11L of the speaker 40L and the power reception coil 11R of the speaker 40R are disposed on one side of the power transmission coil 21.

In this configuration, a distance between the power reception coil 11L and the power transmission coil 21 is shorter than a distance between the power reception coil 11R and the power transmission coil 21. Therefore, in order to have the power reception coils 11L and 11R generate equivalent electric power, it is preferable to have the number of turns of the power reception coil 11R be larger than that of the power reception coil 11L. Alternatively, the diameter of the power reception coil 11R or the diameter of the coil wire material of the power reception coil 11R may be made larger than the diameter of the power reception coil 11L or the diameter of the coil wire material of the power reception coil 11L, or each of the materials of the power reception coils 11L and 11R may be differentiated.

The configuration according to this embodiment, the charging apparatus 2 can be disposed behind the speakers 40L and 40R, and thus the speakers 40L and 40R can be brought into close contact with one another. Consequently, an effect of more easily making a configuration with which the user cannot visually recognize the charging apparatus 2 is achieved.

Fifth Embodiment

Figure 8:
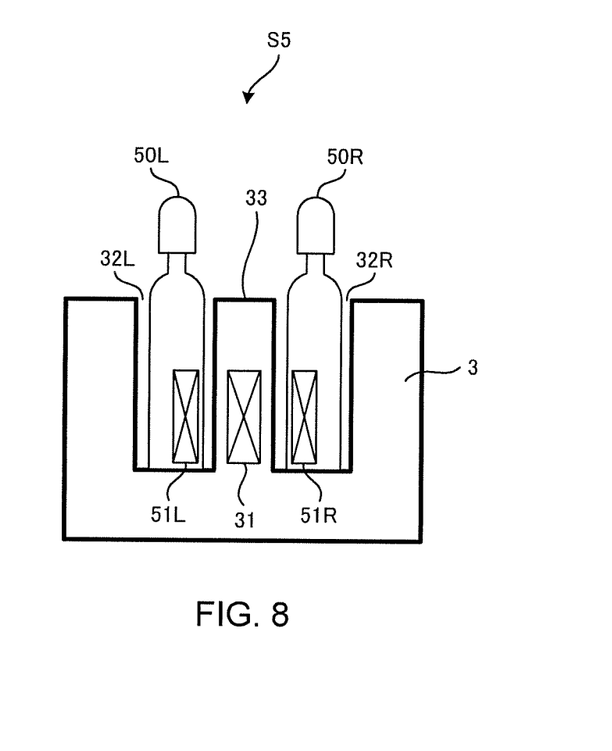
FIG. 8 shows a configuration of an acoustic system according to the fifth embodiment.

FIG. 8 shows a configuration of an acoustic system S5 according to the fifth embodiment. The acoustic systems S5 has, as an acoustic transducer, a left channel earphone 50L and a right channel earphone 50R instead of the above-mentioned box-shaped speakers. Also, the acoustic system S5 has a charging apparatus 3 that includes a concave portion 32L for accommodating the earphone 50L and a concave portion 32R for accommodating the earphone 50R. The earphones 50L and 50R respectively have a left channel power reception coil 51L and a right channel power reception coil 51R which generate electric power based on a magnetic flux generated by the charging apparatus 3.

As shown in FIG. 8, in the charging apparatus 3, a power transmission coil 31 is provided within a convex portion 33 which is provided between a plurality of concave portions 32L and 32R that respectively accommodate the earphone 50L and the earphone 50R. The user can charge the earphones 50L and 50R by respectively inserting the earphones 50L and 50R into the concave portions 32L and 32R of the charging apparatus 3 so that the power reception coils 51L and 51R are disposed in the vicinity of the power transmission coil 31.

Sixth Embodiment

Figure 9:
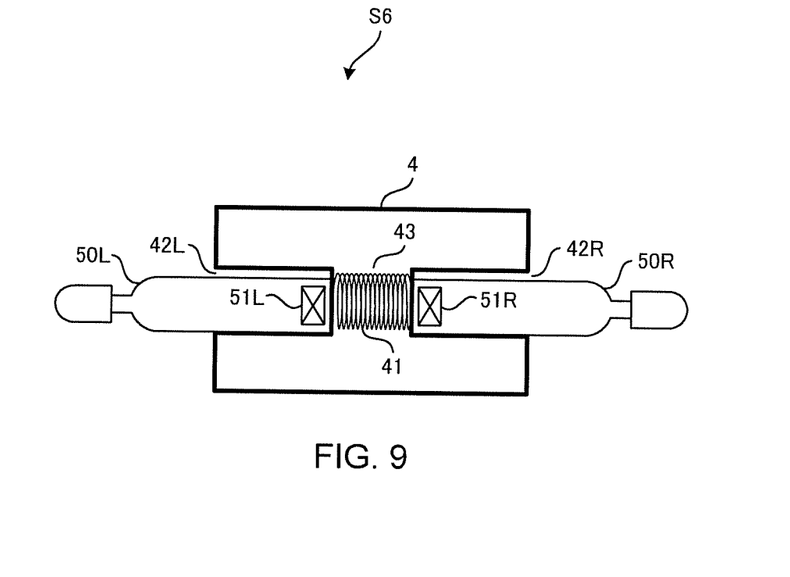
FIG. 9 shows a configuration of an acoustic system according to the sixth embodiment.

FIG. 9 shows a configuration of an acoustic system S6 according to the sixth embodiment. The acoustic systems S6 has, as an acoustic transducer, a left channel earphone 50L and a right channel earphone 50R. Also, the acoustic system S6 has a charging apparatus 4 that includes a concave portion 42L for accommodating the earphone 50L and a concave portion 42R for accommodating the earphone 50R.

The points that differ from FIG. 8 are as follows. The concave portions 42L and 42R are provided on respective sides of the charging apparatus 4, so that a longitudinal direction is in a lateral direction (horizontal direction), in positions opposed to one another across a coupling portion 43 that couples an upper area and a lower area of the charging apparatus 4. The power transmission coil 41 is provided in the coupling portion 43. The power reception coils 51R and 51R are provided at the bottoms of the respective earphones 50L and 50R.

With the above-mentioned configuration, the power reception coils 51L and 51R are disposed on respective sides of the power transmission coil 41 by the earphones 50L and 50R being respectively inserted to the concave portions 42L and 42R of the charging apparatus 4, and the earphones 50L and 50R can be charged.

[Variations]

In the first to the fourth embodiments, cases where the number of speakers to be charged with the charging apparatus 2 is two have been given as examples, but the acoustic system may be configured to charge three or more speakers at the same time. For example, if there are four speakers, the acoustic system is configured so that power reception coils of two speakers are disposed on the central axis of the power transmission coil 21 on both sides of the power transmission coil 21 of the charging apparatus 2.

In this case, it is preferable to have the number of turns of the power reception coil of the speaker that is disposed farther from the power transmission coil 21 be more than the number of turns of the power reception coil of the speaker disposed closer to the power transmission coil 21. This enables each power reception coil to generate approximately the same electric power regardless of the distance from the power transmission coil 21.

Also, the number of turns of the power reception coil may correspond to the capacity of a battery of the speaker. Specifically, the larger the capacity of the battery of the speaker, the greater the number of turns of the power reception coil is configured to have. In this way, charging should be completed in approximately the same time regardless of the capacity of the battery of the speaker.

Also, in the above-mentioned explanation, cases where the diameter of the power transmission coil 21 (that is, the width in the direction orthogonal to the central axis) and the diameter of the power reception coil 11 are the same were given as examples, but the diameter of the power transmission coil 21 and that of the power reception coil may differ. For example, if the diameter of the power transmission coil 21 is larger than that of the power reception coil 11, more electric power can be generated by the power reception coil because the number of magnetic fluxes received by the power reception coil 11 increases in comparison to the case where the diameters of the power transmission coil 21 and the power reception coil are the same.

Also, the electro-acoustic transducer system of the above-mentioned explanation was assumed to include the charging apparatus and either a plurality of speakers or a plurality of earphones, but the electro-acoustic transducer system may also be configured with a plurality of speakers or a plurality of earphones that are chargeable with the charging apparatus.

Also, in the above-mentioned explanation, speakers and earphones were given as examples of the electro-acoustic transducer, but the electro-acoustic transducer may also be a headphone, a hearing aid, or any other device as long as the device emits a sound based on an electrical signal.

Also, in the above-mentioned explanation, cases where the sound source 1 transmits the electrical signals to and from the speaker 10 via the wireless channel W were given as examples, but the sound source 1 and the speaker 10 may also be wire connected.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. An electro-acoustic transducer system, comprising:
a first electro-acoustic transducer;
a second electro-acoustic transducer; and
a charging apparatus that charges the first electro-acoustic transducer and the second electro-acoustic transducer,
wherein
the charging apparatus includes:
an electric power acquisition part that acquires electric power from an exterior power supply; and
a power transmission coil that generates a magnetic flux based on electric power acquired by the electric power acquisition part, and
the first electro-acoustic transducer includes:
a first electro-acoustic transducer part that generates a sound based on a first electrical signal; and
a first power reception coil that generates electric power to be supplied to the first electro-acoustic transducer part with the magnetic flux generated by the power transmission coil, the first power reception coil being configured to be disposed at a position where at least a part of the first power reception coil overlaps with an extension line of a central axis of the power transmission coil, and
the second electro-acoustic transducer includes:
a second electro-acoustic transducer part that generates a sound based on a second electrical signal; and
a second power reception coil that generates electric power to be supplied to the second electro-acoustic transducer part with the magnetic flux generated by the power transmission coil, the second power reception coil being configured to be disposed at a position where at least a part of the second power reception coil overlaps with the extension line of the central axis of the power transmission coil, and
the charging apparatus, the first electro-acoustic transducer, and the second electro-acoustic transducer are configured to allow the power transmission coil to be disposed between the first power reception coil and the second power reception coil.

2. The electro-acoustic transducer system according to claim 1, wherein the first power reception coil and the second power reception coil generate electric power with the magnetic flux generated by the power transmission coil in a state where a central axis of the first power reception coil and a central axis of the second power reception coil are disposed on the extension line of the central axis of the power transmission coil.

3. The electro-acoustic transducer system according to claim 1, wherein one side of a front face of the first electro-acoustic transducer and one side of a front face of the second electro-acoustic transducer are configured to contact each other in a state where the first power reception coil and the second power reception coil generate electric power based on the magnetic flux generated by the power transmission coil.

4. The electro-acoustic transducer system according to claim 1, wherein the first electro-acoustic transducer includes:
   a chargeable battery, and
   a CPU that starts supplying electric power generated by the first power reception coil to the battery when a remaining charge amount of the battery is equal to or less than a threshold value.

5. The electro-acoustic transducer system according to claim 4, wherein the CPU controls a speaker unit included in the first electro-acoustic transducer to emit a warning sound upon detecting that electric power is not being supplied from the first power reception coil when the remaining charge amount of the battery is equal to or less than the threshold value.

6. The electro-acoustic transducer system according to claim 1, wherein the charging apparatus further includes:
   a CPU that controls an electronic circuit to start supplying electric power to the power transmission coil when detecting that at least one of the first power reception coil and the second power reception coil is at the chargeable position.

7. The electro-acoustic transducer system according to claim 6, wherein the CPU controls the electronic circuit to prohibit supplying electric power to the power transmission coil while not detecting that at least one of the first power reception coil and the second power reception coil is at the chargeable position.

8. The electro-acoustic transducer system according to claim 6, wherein the CPU controls the electronic circuit to start supplying electric power to the power transmission coil under the conditions that (i) at least one of the first electro-acoustic transducer and the second electro-acoustic transducer is at the chargeable position and (ii) a piece of information that at least one of the first electro-acoustic transducer and the second electro-acoustic transducer needs to be charged is received, from at least one of the first electro-acoustic transducer and the second electro-acoustic transducer.

9. The electro-acoustic transducer system according to claim 1, wherein the charging apparatus further includes a ferrite core in a cylindrical shape that prevents a leakage of the magnetic flux generated by the power transmission coil to the outside.

10. The electro-acoustic transducer system according to claim 1, wherein the first electro-acoustic transducer and the second electro-acoustic transducer further include a ferrite core in a cylindrical shape with one opening closed, the ferrite core being configured to prevent a leakage of the magnetic flux generated by the power transmission coil to the outside.

11. The electro-acoustic transducer system according to claim 1, wherein the first electro-acoustic transducer and the second electro-acoustic transducer are configured to charge the battery included in the first electro-acoustic transducer and the battery included in the second electro-acoustic transducer while the first power reception coil and the second power reception coil are disposed on one side of the power transmission coil.

12. The electro-acoustic transducer system according to claim 11, wherein
   the first electro-acoustic transducer is configured to be disposed closer to the charging apparatus than the second electro-acoustic transducer, and
   the number of turns or a diameter of the first power reception coil is less than the number of turns or a diameter of the second power reception coil.

13. The electro-acoustic transducer system according to claim 1, wherein the first electro-acoustic transducer and the second electro-acoustic transducer are box-shaped speakers.

14. The electro-acoustic transducer system according to claim 1, wherein the first electro-acoustic transducer and the second electro-acoustic transducer are earphones.

15. An electro-acoustic transducer system, comprising:
   a first electro-acoustic transducer;
   a second electro-acoustic transducer; and
   a charging apparatus that charges the first electro-acoustic transducer and the second electro-acoustic transducer, wherein
   the charging apparatus includes:
      an electric power acquisition part that acquires electric power from an exterior power supply; and
      a power transmission coil that generates a magnetic flux based on electric power acquired by the electric power acquisition part, and
   the first electro-acoustic transducer includes:
      a first electro-acoustic transducer part that generates a sound based on a first electrical signal; and
      a first power reception coil that generates electric power to be supplied to the first electro-acoustic transducer part with the magnetic flux generated by the power transmission coil, the first power reception coil being configured to be disposed at a position where at least a part of the first power reception coil overlaps with an extension line of a central axis of the power transmission coil, and
   the second electro-acoustic transducer includes:
      a second electro-acoustic transducer part that generates a sound based on a second electrical signal; and
      a second power reception coil that generates electric power to be supplied to the second electro-acoustic transducer part with the magnetic flux generated by the power transmission coil, the second power reception coil being configured to be disposed at a position where at least a part of the second power reception coil overlaps with the extension line of the central axis of the power transmission coil, and
   the number of turns of the first power reception coil and the number of turns of the second power reception coil are the same.

16. An electro-acoustic transducer system, comprising:
   a first electro-acoustic transducer;
   a second electro-acoustic transducer; and
   a charging apparatus that charges the first electro-acoustic transducer and the second electro-acoustic transducer, wherein
   the charging apparatus includes:
      an electric power acquisition part that acquires electric power from an exterior power supply; and
      a power transmission coil that generates a magnetic flux based on electric power acquired by the electric power acquisition part, and
   the first electro-acoustic transducer includes:
      a first electro-acoustic transducer part that generates a sound based on a first electrical signal; and a first power reception coil that generates electric power to be supplied to the first electro-acoustic transducer part with the magnetic flux generated by the power transmission coil, the first power reception coil being configured to be disposed at a position where at least a part of the first power reception coil overlaps with an extension line of a central axis of the power transmission coil, and the second electro-acoustic transducer includes:

a second electro-acoustic transducer part that generates a sound based on a second electrical signal; and a second power reception coil that generates electric power to be supplied to the second electro-acoustic transducer part with the magnetic flux generated by the power transmission coil, the second power reception coil being configured to be disposed at a position where at least a part of the second power reception coil overlaps with the extension line of the central axis of the power transmission coil, and the first electro-acoustic transducer includes the first power reception coil near a side surface which is disposed close to a side of the charging apparatus when electric power is generated based on the magnetic flux generated by the power transmission coil, and the second electro-acoustic transducer includes the second power reception coil near a side surface which is disposed close to a side of the charging apparatus when electric power is generated based on the magnetic flux generated by the power transmission coil.

17. The electro-acoustic transducer system according to claim 16, wherein the first power reception coil is disposed inside of a right side of the first electro-acoustic transducer, and the second power reception coil is disposed inside of a left side of the second electro-acoustic transducer.

18. The electro-acoustic transducer system according to claim 17, wherein the charging apparatus is disposed between the right side of the first electro-acoustic transducer and the left side of the second electro-acoustic transducer.

* * * * *